M. SHEVLIN.
VALVE FOR PUMPS.
APPLICATION FILED JUNE 10, 1920.

1,381,078.

Patented June 7, 1921.

Miles Shevlin INVENTOR.

BY

Jesse R. Stone ATTORNEY.

UNITED STATES PATENT OFFICE.

MILES SHEVLIN, OF HOUSTON, TEXAS, ASSIGNOR TO W. L. DRAKE, OF DES MOINES, IOWA.

VALVE FOR PUMPS.

1,381,078. Specification of Letters Patent. Patented June 7, 1921.

Application filed June 10, 1920. Serial No. 388,023.

*To all whom it may concern:*

Be it known that I, MILES SHEVLIN, a citizen of the United States, residing at Houston, Harris county, Texas, have invented a certain new and useful Improvement in Valves for Pumps, of which the following is a full, clear, and exact description, such as will enable others skilled in the art to which it appertains to make and use the same.

My invention relates to improvements in valves to be used in deep well pumping and has particular application to pumps working in liquids wherein are included quantities of sand, shale or sediment.

The object of my improvement is to provide a pump valve wherein the fluid will be agitated in its travel past the valve so as to prevent clogging of the valve by sand. Another object is to provide a pump plunger wherein the valve will be self-cleaning and self-grinding, so as to maintain a uniformly tight closure at all times when the valve is seated.

Another object is to maintain the valve uniformly balanced so that no excessive wear will occur on any particular part of the same.

I obtain the aforesaid objects by the mechanism illustrated in the accompanying drawings wherein like numerals are applied to like parts throughout the several views.

Figure 1:
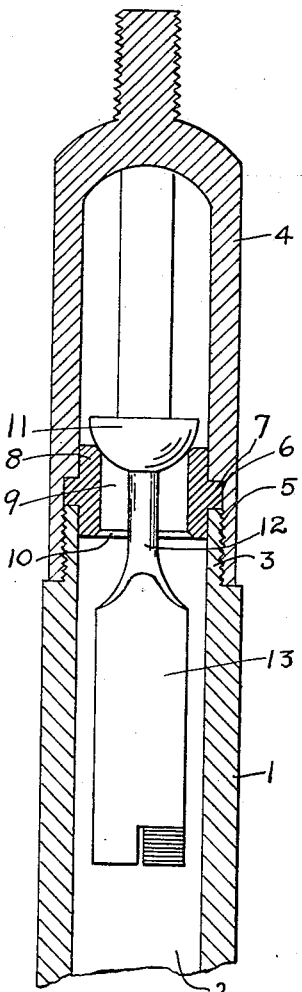
Figure 2:
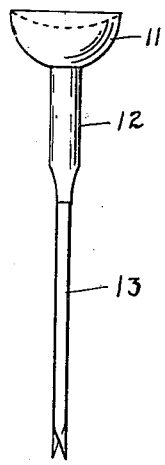
Figures 3, 4:
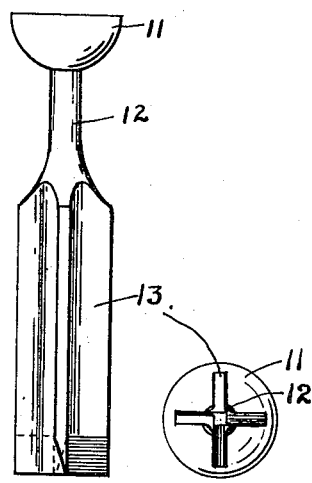

Figure 1 illustrates one embodiment of my invention, the view being taken in central longitudinal section. Fig. 2 is a side elevation of the valve shown in Fig. 1. Fig. 3 is a side elevation of a valve showing a slightly different form of the agitating blade. Fig. 4 is a bottom plan view of the embodiment shown in Fig. 3.

The pump plunger illustrated in Fig. 1, and to which I have shown my device applied, is one of ordinary construction having a traveling barrel 1 with a central passage or chamber 2 therein. The upper end of this working barrel is reduced in diameter and threaded at 3 for attachment to the valve cage 4, said cage being counter-bored and threaded at its lower end, as shown at 5, to receive said part 3. An annular recess 6 is thus provided between the adjacent shoulders on the barrel and the cage to receive a central peripheral attaching flange 7 of a valve seat 8. The seat 8 has a central passage 9 therethrough, the upper and lower ends of which are beveled at 10. The valve seat is hence reversible, as will be apparent. An approximately hemispherical shaped valve 11 is situated within the cage 4, the flat side thereof placed upwardly and the rounded side fitting within the beveled upper end of the passage 9 in the valve seat.

Depending centrally from the rounded face of the valve, is a stem 12, which, at a point spaced somewhat below said valve, is flattened out into an agitating blade 13. Said blade is of balanced construction and hence is as straight as possible and the lower end is formed to cause rotation thereof by the upward passage of fluid past the same. The opposite halves of the lower end are beveled in opposite directions from the central axis of the blade so that the water will impinge against the beveled face of one side tending to force it in one direction while the same action on the opposite beveled face will force that half in the opposite direction, the resultant action being a clockwise rotation as viewed from below. This form of beveled lower end on the blade produces an especially efficient rotation as it results in an even balanced motion, entirely without the usual vibration caused by a spiral blade.

If preferred, a double blade such as is shown in Fig. 3 may be used. In this modification, two blades, 13' preferably made integral, and arranged at right angles to each other, are mounted on the lower end of the stem or shank 12. The lower ends of the blades are beveled, as in the previously described construction, to cause rotation of the valve. The upper face of the valve may be flat or may be slightly concaved as shown in Fig. 2, the object being to effect a positive seating of the valve when the upward stroke occurs.

In the operation of my device the downward stroke of the plunger will act to close the foot valve, not shown, and cause an upward flow of fluid past the valve. This will raise the valve from its seat, and the contact of the fluid with the agitating blade will cause it to rotate. This will act to impart a whirling motion to the current of fluid, thus enabling it to better carry the sand therein past the valve. Any sand within the plunger will be agitated and stirred up by the blade 13 and it will not be allowed to pack.

The even balanced action of the agitator will cause an even wear to the valve within its seat thus causing it to be self-grinding. An even tight fit will therefore be always maintained.

The flat or concaved top of the valve will, on the upward stroke, receive the full static head of fluid above and positively force the valve within its seat and maintain it closed during that stroke. The even balanced motion of my valve and the positive seating of the same are valuable features of my invention. The tendency of gas pressure, so frequent in oil wells, to rock the valve and cause wear thereto will be overcome by this structure. This type of valve construction can also be used in the standing valve as will be obvious.

Having thus described my invention, what I claim as new and desire to protect by Letters Patent is:

1. In a pump, the combination of a pump plunger, a valve seat therein, an upwardly opening valve thereon, said valve having its top flat and its lower face shaped to fit within said seat, a stem secured centrally to said lower face, a blade thereon within said plunger, the said blade being straight and balanced and having its lower end beveled in opposite directions to cause the rotation thereof.

2. In a pump, in combination with a pump plunger, an upwardly opening valve, a flat top thereon, a stem depending centrally from said valve, a straight agitating member on the lower end thereof within said plunger, said member comprising two integral blades at right angles to each other and having the lower ends thereof beveled to cause rotation of said valve.

In testimony whereof I hereunto affix my signature, this the 7th day of June, A. D. 1920.

MILES SHEVLIN.